Sept. 2, 1924.  
E. R. CLAYTON ET AL  
DRAFT AND STEERING RIG FOR TRAILERS  
Filed May 31, 1923

1,507,335

Inventors  
E. R. Clayton  
C. R. Welch  
by Hazard & Miller  
Attys

Witness  
Fredrick Duetschi

Patented Sept. 2, 1924.

1,507,335

UNITED STATES PATENT OFFICE.

EARL R. CLAYTON AND CORWIN R. WELCH, OF LOS ANGELES, CALIFORNIA.

DRAFT AND STEERING RIG FOR TRAILERS.

Application filed May 31, 1923. Serial No. 642,562.

*To all whom it may concern:*

Be it known that we, EARL R. CLAYTON and CORWIN R. WELCH, citizens of the United States, residing at Los Angeles, in the county of Los Angeles and State of California, have invented new and useful Improvements in Draft and Steering Rigs for Trailers, of which the following is a specification.

Our invention relates to draft and steering rigs for drawn vehicles. The present application is a continuation in part of our companion application for draft and steering rigs for trailers filed Aug. 11, 1922, Serial Number 581,145, as originally filed.

A purpose of our present invention is the provision of a draft and steering rig having novel means for moving the spring strip to disengaged position with respect to the draft bar and for maintaining the same in disengaged position in such manner that the nearly unrestricted movement of the steering mechanism and front wheels of the drawn vehicle is insured to facilitate the manual operation of the steering mechanism as when backing the drawn vehicle.

Although we have herein shown and described only one form of draft and steering rig embodying our invention, it is to be understood that various changes and modifications may be made herein without departing from the spirit of the invention and the spirit and scope of the appended claims.

In the accompanying drawings.

Figure 1:
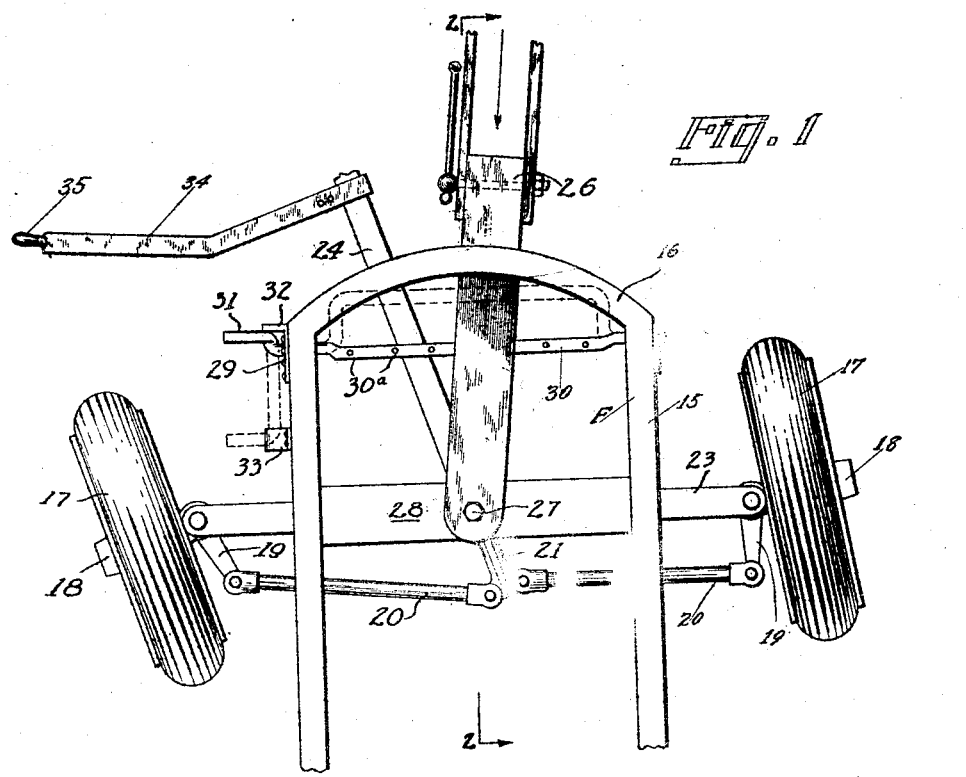
Figure 1 is a fragmentary view showing in top plan a conventional form of drawn vehicle or trailer having applied thereto one form of draft and steering rig embodying our invention.

Referring specifically to the drawings in which similar reference characters refer to similar parts, our invention is shown as applied to a drawn vehicle or trailer including a frame or chassis F having side rails 15, and a front curved rail 16. The front wheels 17 of the vehicle are mounted on stub axles 18 provided with arms 19 to which links 20 are connected. The links 20 are in turn pivotally connected to a downwardly inclined arm 21 constituting an extension of a bearing 22 rotatably mounted upon a front axle 23 of the vehicle. A yieldable spring strip 24 is secured at its lower end to the bearing 22 while its upper end is arranged to be engaged by a yoke 25 carried by a draft bar 26 pivoted at the point indicated at 27 upon a cross bar 28. As clearly shown in Fig. 2, the draft bar is extended through a slot in the rail 16 so as to allow swinging movement of the draft bar about the pivot 27 as an axis.

The yoke 25 is secured to the draft bar 26 at a point beyond the rail 16 so that in the normal position of the spring strip 24, the latter is engaged by the yoke to provide an operative connection between the draft bar and the steering mechanism including the links 20 and the arms 19.

Figure 2:
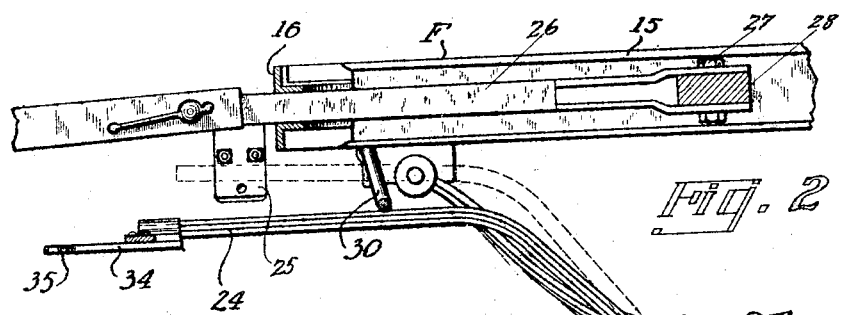
Fig. 2 is a fragmentary vertical sectional view taken substantially on the line 2—2 of Fig. 1.
Figure 3:
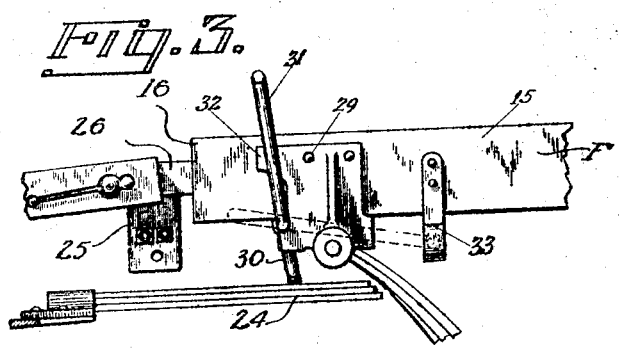
Fig. 3 is a fragmentary view somewhat enlarged showing in side elevation the vehicle chassis and adjacent mechanism.

As clearly shown in Figs. 1 and 3, plates 29 are secured to the outer sides of the rails 15, and journaled in these plates is a crank 30 mounted to occupy one extreme position in which it engages and depresses the spring strip 24 to the position shown in Fig. 2, and another extreme position in which the spring strip is disengaged to allow the latter to move into the yoke 25 as clearly shown in Fig. 3. One end of the crank 30 is extended and bent to form an operating handle 31 which in one extreme position of the crank engages a lip 32 formed on one of the plates 29, and in the other extreme position engages a spring retaining member 33 secured to the chassis F.

In operation, the forward end of the spring strip 24 is normally elevated to engage within the yoke 25 and to thereby provide the necessary operative connection between the draw bar 26 and the steering mechanism for the wheels 17. However, when it is desired to disconnect the steering mechanism from the draw bar in order that a manual manipulation of the steering mechanism may be effected, the crank 30 is lowered to the position shown in Fig. 2 by operation of the handle 31 thereby depressing the forward end of the spring strip 24 so as to move it out of engagement with the yoke 25. The steering mechanism may now be manually manipulated through the medium of the spring strip. In order to eliminate the necessity of the operator stepping to a position between a truck connected to and serving to back the trailer, an arm 34 is detachably connected to the forward end of the spring strip 24. This arm may be gripped at a handle 35 and manipulated to operate the front wheels 17 of the trailer, as will be understood.

It is to be particularly noted that when the spring strip is depressed, as shown in Fig. 2, it can still be moved to effect an operation of the steering mechanism without any possibility of the arm binding, although it has sliding contact with the crank 30. However, the resistance offered by the crank is small so that it may be said that movement of the spring strip is unrestricted.

In order to facilitate the rearward steering of the drawn vehicle when only a single operator is manipulating the truck or vehicle connected to and moving the trailer rearwardly, we provide a crank 30 with openings 30$^a$ formed at regular intervals along the left of the crank, and any two of which are adapted to receive pins 30$^b$. As shown in Figures 1 and 2, the pins cooperate to lock a spring strip 24 against lateral or horizontal movement thereby securing the steering-wheel 17 in any desired position to which they may be adjusted. The openings 30$^a$ allow the adjustment of the pins to secure the spring strip in any desired position.

From the foregoing, it will be clear that should an operator desire to back the trailer to a predetermined point, he first adjusts the steering wheels to the desired position when the entire steering mechanism may be locked by adjusting the pins 30$^b$ to engage the spring strip 34. He is then free to back the truck in effecting his rearward movement of the trailer, and with the wheel 17 of the trailer properly set, the trailer can be backed to the desired point.

What we claim is:

1. A draft and steering rig of the character described comprising a draft bar adapted for pivotal movement upon the frame of a vehicle, a resilient member adapted for operative connection to the steerable wheels of the vehicle, said resilient member being normally urged to a position in which it provides an operative connection between the draft bar and said wheels, and means for moving the resilient member to cause the same to be disconnected from the draft bar, said means comprising a crank arranged to allow the resilient member to have sliding contact therewith so as to permit of the manual movement of the member in effecting a steering of the wheels of the vehicle.

2. In combination, a vehicle including wheels capable of being steered, a steering mechanism for the wheels including a resilient member, a draw bar pivoted on the vehicle, means for connecting the resilient member to the draw bar to permit the steering mechanism to be operated by the draw bar, and a transverse cranked element of substantial width presenting a smooth bottom surface to facilitate the sliding of the resilient member and for disconnecting the resilient member from the draw bar and in a manner to allow movement of the resilient member along the cranked element, and means connected to the resilient member for manually moving the resilient member.

3. In combination, a vehicle including wheels capable of being steered, a steering mechanism for the wheels including a resilient member, a draw bar pivoted on the vehicle, a yoke carried by the draw bar and normally engaged by the resilient member to provide an operative connection between the steering mechanism and the draw bar, a crank for moving the resilient member out of engagement with said yoke, and means for releasably securing the resilient member against movement with respect to said crank.

4. A draft and steering rig comprising a pivoted draft a resilient member normally urged to a position in which it is connected to the draft bar for movement therewith, and a transverse cranked element of a substantial width presenting a smooth bottom surface to facilitate the sliding of the resilient member and for disconnecting the resilient member from the draft bar.

In testimony whereof we have signed our names to this specification.

EARL R. CLAYTON.
CORWIN R. WELCH.